United States Patent
Ung-Chhun et al.

[11] Patent Number: 5,972,217
[45] Date of Patent: Oct. 26, 1999

[54] BLOOD CELL SEPARATION DEVICES HAVING A MEMBRANE WITH PARTICULAR COATING

[75] Inventors: Neng S. Ung-Chhun, Lincolnshire; Richard J. Johnson, Mundeline, both of Ill.

[73] Assignee: Baxter International Inc., Deerfield, Ill.

[21] Appl. No.: 08/971,887

[22] Filed: Nov. 17, 1997

Related U.S. Application Data

[60] Continuation-in-part of application No. 08/810,751, Mar. 4, 1997, Pat. No. 5,795,483, which is a division of application No. 08/323,559, Oct. 17, 1994, Pat. No. 5,647,985.

[51] Int. Cl.[6] .................................................. B01D 61/18
[52] U.S. Cl. ..................... 210/321.68; 210/504; 210/506
[58] Field of Search ................................... 210/503, 504, 210/505, 506, 507, 508, 321.68; 422/101; 427/244, 258, 384, 402, 407.1

[56] References Cited

U.S. PATENT DOCUMENTS

| | | | |
|---|---|---|---|
| 3,945,926 | 3/1976 | Kesting | 210/500.4 |
| 4,053,420 | 10/1977 | Marx | 210/435 |
| 4,130,642 | 12/1978 | Kikygawa et al. | 424/533 |
| 4,256,588 | 3/1981 | Hoehn et al. | 210/692 |
| 4,283,289 | 8/1981 | Meyst et al. | 210/448 |
| 4,330,410 | 5/1982 | Takenaka et al. | 210/767 |
| 4,358,476 | 11/1982 | Zimmer et al. | 427/494 |
| 4,399,035 | 8/1983 | Nohmi et al. | 210/500.2 |
| 4,416,777 | 11/1983 | Kuroda et al. | 210/446 |
| 4,596,657 | 6/1986 | Wisdom | 210/206 |
| 4,618,533 | 10/1986 | Steuck | 428/315.7 |
| 4,701,267 | 10/1987 | Watanabe et al. | 210/806 |
| 4,767,541 | 8/1988 | Wisdom | 210/749 |
| 4,810,378 | 3/1989 | Wisdom | 210/206 |
| 4,855,063 | 8/1989 | Carmen et al. | 210/249 |
| 4,880,548 | 11/1989 | Pall et al. | 210/767 |
| 4,915,848 | 4/1990 | Carmen et al. | 210/749 |
| 4,917,799 | 4/1990 | Carmen et al. | 210/435 |
| 4,919,823 | 4/1990 | Wisdom | 210/749 |
| 4,925,572 | 5/1990 | Pall | 210/767 |

(List continued on next page.)

FOREIGN PATENT DOCUMENTS

| | | |
|---|---|---|
| 58983/90 | 1/1991 | Australia . |
| 0 370 584 | 5/1988 | European Pat. Off. . |
| 0 397 403 | 11/1990 | European Pat. Off. . |
| 0 406 485 | 1/1991 | European Pat. Off. . |
| 0 408 462 | 1/1991 | European Pat. Off. . |
| 0 419 346 | 3/1991 | European Pat. Off. . |
| 0 500 472 | 9/1993 | European Pat. Off. . |
| 0 561 379 | 9/1993 | European Pat. Off. . |
| 03000 074 | 12/1988 | Japan . |
| 05034337 | 7/1991 | Japan . |
| 05087808 | 9/1991 | Japan . |
| 05148150 | 11/1991 | Japan . |
| 05148151 | 11/1991 | Japan . |
| 4-187206 | 7/1992 | Japan . |
| 5-194243 | 3/1993 | Japan . |
| 9308904 | 5/1993 | WIPO . |
| 9303740 | 7/1993 | WIPO . |

*Primary Examiner*—John Kim
*Attorney, Agent, or Firm*—Robert M. Barrett; Bradford R. L. Price; Denise M. Serewicz

[57] ABSTRACT

Blood filtration devices and methods of filtering are disclosed. In part, a blood filtration device is provided comprising a housing defining an interior periphery. The device includes a rotating structure mounted within the interior periphery and defining with the housing an annular gap within the interior periphery, an inlet fluid path for allowing a blood product to flow into the annular gap, and the rotating structure including an exterior surface that includes a filter membrane. The filter membrane has a coating thereon comprising an insitu condensation product of a first electrophilically active, high molecular weight polyalkylene oxide and a second high molecular weight bifunctional diaminopolyoxyalkylene oxide derivative.

6 Claims, 9 Drawing Sheets

U.S. PATENT DOCUMENTS

| | | | |
|---|---|---|---|
| 4,936,993 | 6/1990 | Nomura | 210/446 |
| 4,936,998 | 6/1990 | Nishimura et al. | 210/496 |
| 4,943,287 | 7/1990 | Nishimura et al. | 210/496 |
| 4,976,861 | 12/1990 | Pall | 210/508 |
| 4,985,153 | 1/1991 | Kuroda et al. | 210/496 |
| 4,997,577 | 3/1991 | Stewart | 210/767 |
| 5,034,135 | 7/1991 | Fischel | 210/651 |
| 5,089,146 | 2/1992 | Carmen et al. | 210/206 |
| 5,092,996 | 3/1992 | Spielberg | 210/435 |
| 5,100,551 | 3/1992 | Pall et al. | 210/486 |
| 5,100,564 | 3/1992 | Pall et al. | 210/496 |
| 5,104,788 | 4/1992 | Carmen et al. | 210/516 |
| 5,128,048 | 7/1992 | Stewart et al. | 210/206 |
| 5,190,657 | 3/1993 | Heagle et al. | 210/490 |
| 5,194,145 | 3/1993 | Schoendorfer | 210/651 |
| 5,229,012 | 7/1993 | Pall et al. | 210/767 |
| 5,252,222 | 10/1993 | Matkovish et al. | 210/436 |
| 5,258,126 | 11/1993 | Pall et al. | 210/767 |
| 5,258,127 | 11/1993 | Gsell et al. | 210/767 |

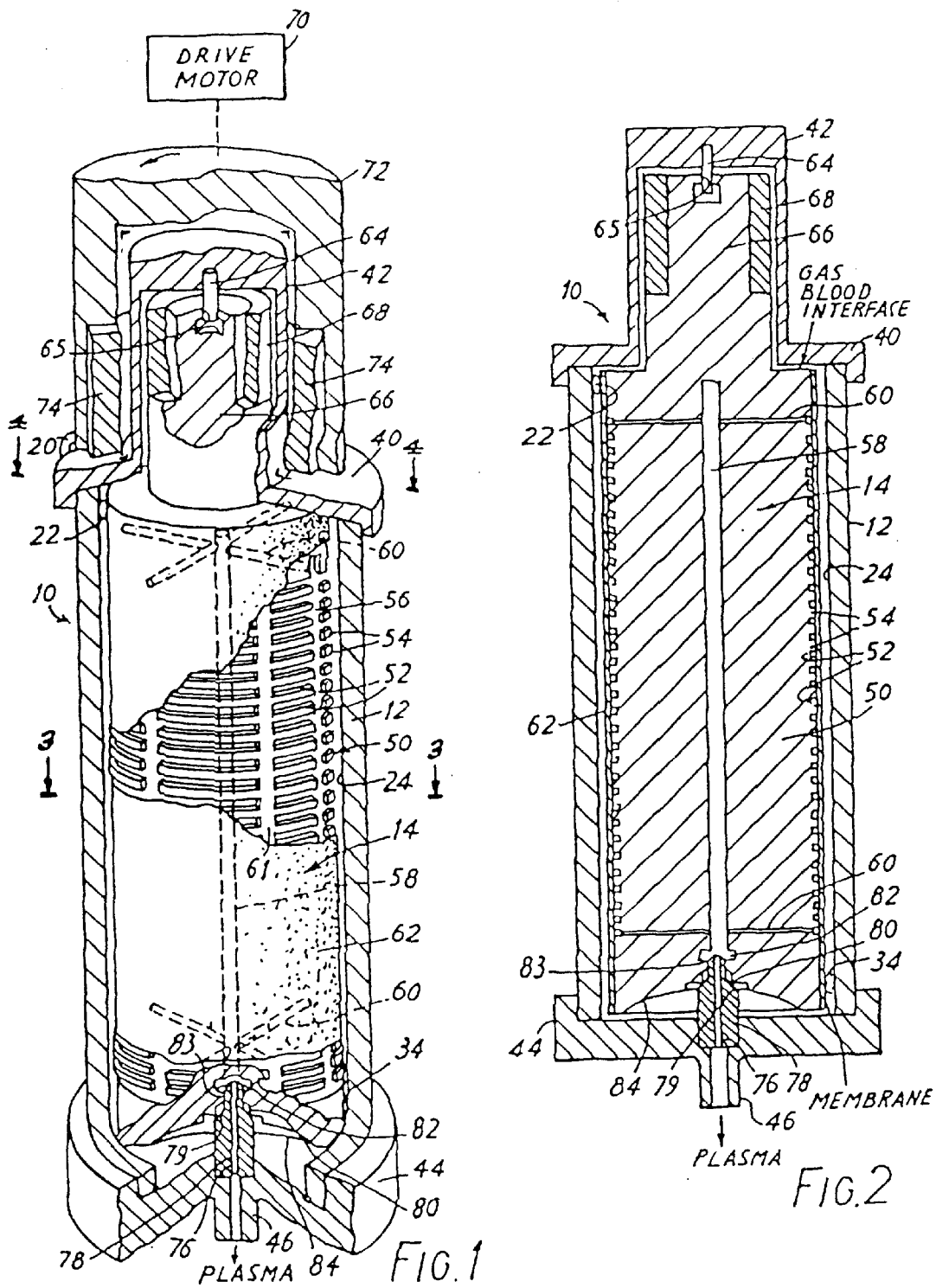

FIG.5

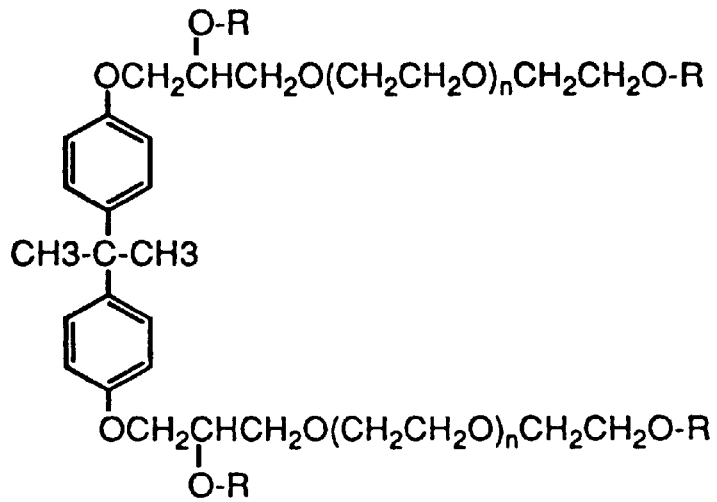

O-R
OCH$_2$CHCH$_2$O(CH$_2$CH$_2$O)$_n$CH$_2$CH$_2$O-R

CH$_3$-C-CH$_3$

OCH$_2$CHCH$_2$O(CH$_2$CH$_2$O)$_n$CH$_2$CH$_2$O-R
O-R

With : 100<n>225

PEO: R=H

Imidazole-PEO: R=-CO-N

Tetraamino PEO: R=-CONH(CH$_2$)$_2$NH$_2$

Tetraacrylate PEO: R=-CH=CH$_2$

1. CH$_3$O(CH$_2$CH$_2$O)$_n$CH$_2$CH$_2$O-R

2. ROCH$_2$CH$_2$O(CH$_2$CH$_2$O)$_n$CH$_2$CH$_2$O-R

PEO: R=H
Imidazole-PEO: R=-CO-N

With : 250<n>450

3.
$$\begin{matrix} & \text{A-CH}_2 & & \text{CH}_2\text{-A} \\ \text{CH}_3\text{CH}_2\text{-C-CH}_2\text{-O-CH}_2\text{-C-CH}_2\text{-CH}_3 \\ & \text{A-CH}_2 & & \text{CH}_2\text{-A} \end{matrix}$$

A= CH$_2$=CH-COO-CH$_2$CH$_2$O(CH$_2$CH2O)$_{77}$

- Uncoated
- × 2.5x T-NH2-PEO
- □ Imz-PEO

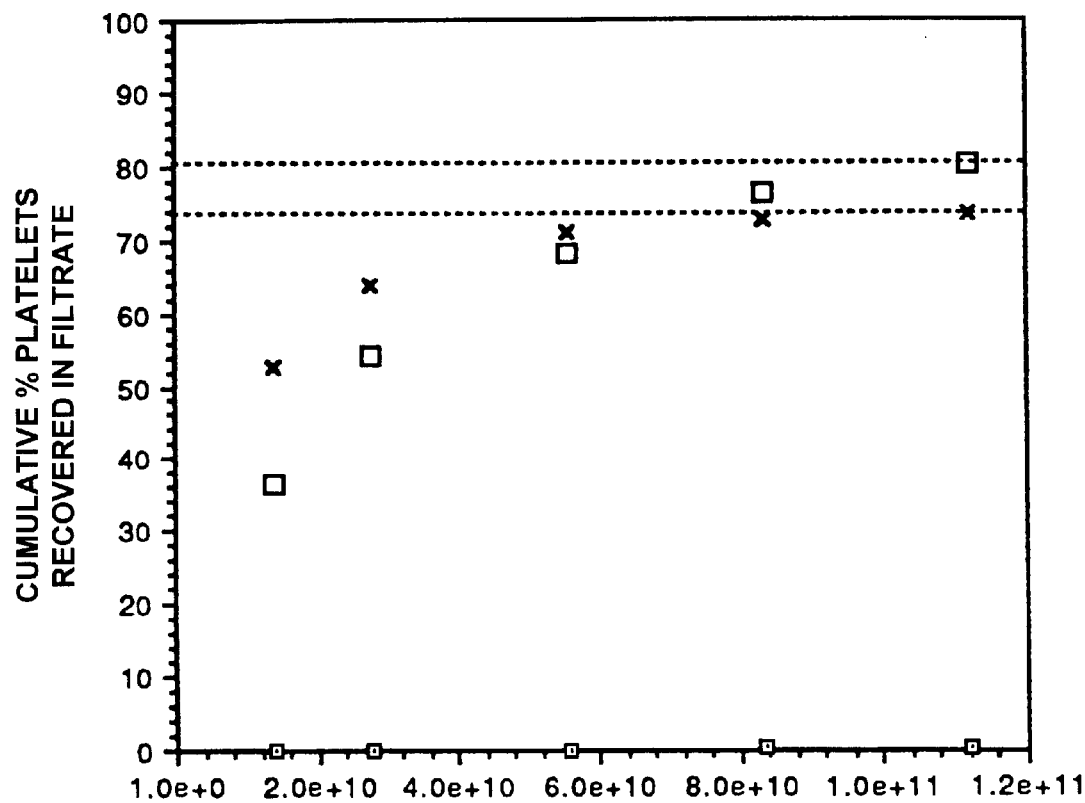

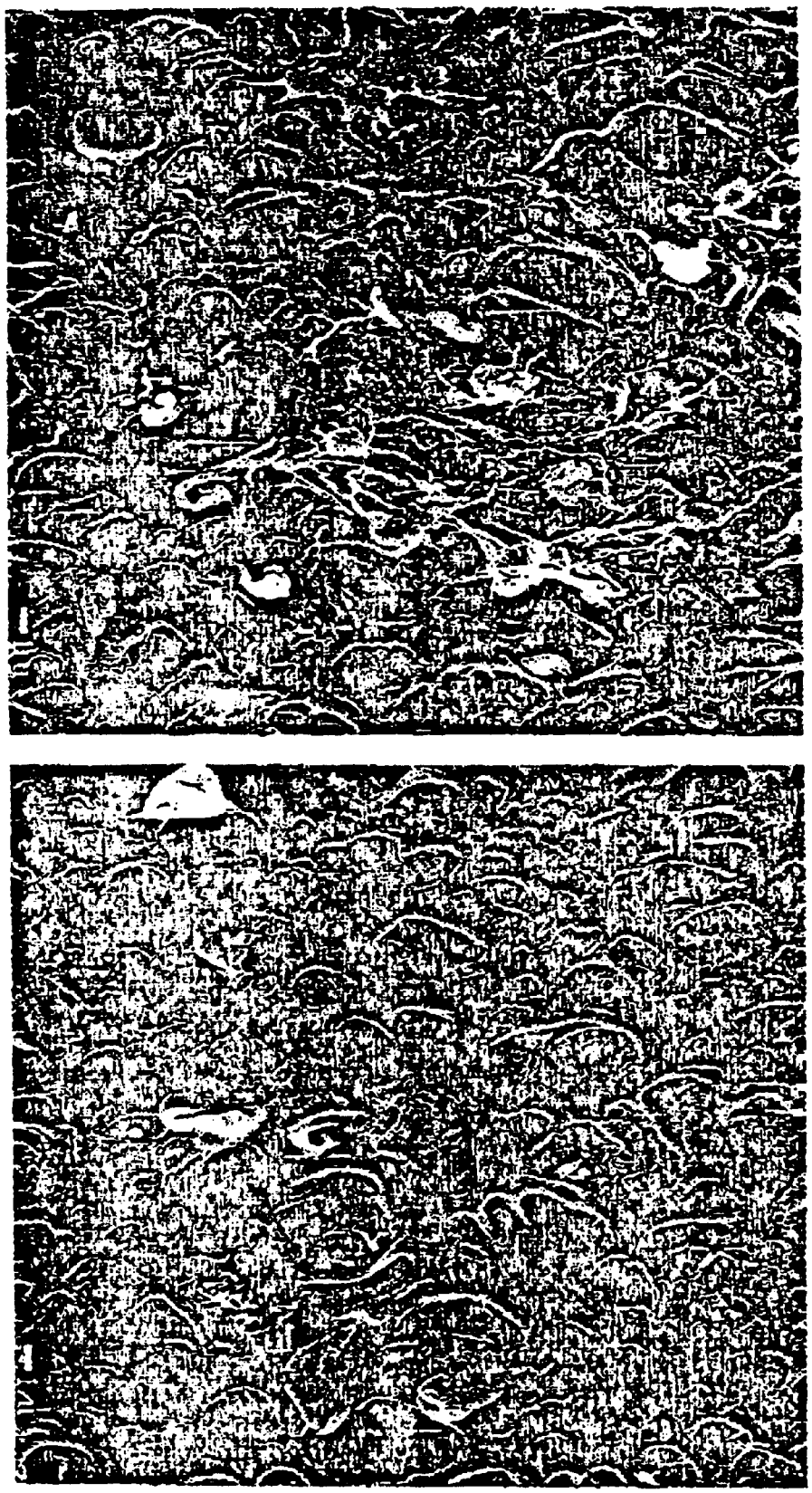

BLOOD CELL SEPARATION DEVICES HAVING A MEMBRANE WITH PARTICULAR COATING

RELATED APPLICATIONS

This is a continuation-in-part of U.S. patent application Ser. No. 08/810,751 filed on Mar. 4, 1997, U.S. Pat. No. 5,795,483 which is a divisional of U.S. patent application Ser. No. 08/323,559 filed Oct. 17, 1994, U.S. Pat. No. 5,647,985.

BACKGROUND OF THE INVENTION

In processing whole blood for therapeutic administration to patients, it is desirable to separate the various cellular components. In particular, it is desirable to remove leukocytes because of their role in mediating immunologic reactions which can cause adverse clinical events such as allosensitization. For a review of adverse clinical sequellae to transfusion, see Sekiguchi, et al., *Leucocyte-depleted blood products and their clinical usefulness*, Ch. 5, pg. 26–33, from *The Role of Leucocyte Depletion in Blood Transfusion Practice* (1988). Furthermore, leukocytes are unessential for therapeutic supplementation of cell deficiencies in patients involving platelets and red cells. Thus, filter systems have been devised for passaging blood cells in order to remove leukocytes while allowing platelets or red blood to pass through for subsequent recovery.

There have been a number of approaches reported for leukocyte depletion. U.S. Pat. No. 4,330,410 discloses a packed fiber mass with leukodepletion properties comprising fibers of cellulose acetate, acrylonitrile, polyamide, or polyester. U.S. Pat. No. 4,925,572 discloses use of a gelatin coating to inhibit red blood cell (RBC) and platelet adhesion. Leukodepletion is accomplished primarily through physical entrainment of the cells in the fiber body, and adhesion of RBCs and platelets results from the gelatin coating. U.S. Pat. No. 4,936,998 discloses a strategy for leukodepletion in which a hydrophilic monomer containing hydroxyl or amido groups and functional nitrogen-containing groups such as primary or secondary amino groups is coated onto a filter matrix of known fibers such as polyester, polyamide, etc.

Modification of fiber surfaces has also been used to obtain materials with improved cell separation properties. For example, U.S. Pat. No. 4,130,642 discloses a packed column in which the packing material comprises an Egyptian cotton which has been de-fatted and bleached so that RBC readily pass through the column.

Some separation strategies involve multiple steps. U.S. Pat. No. 4,925,572 discloses a multistep method comprising an upstream porous element for removal of gels, a second element of finer porosity for removal of aggregated matter, and a final filtration step involving common fibers to which surface tension-reducing and improved wetting are obtained by radiation grafting of biocompatible moieties. Further description of leukodepletion methods is contained in Rikumaru, et al. *Advanced methods for leucocyte removal by blood filtration*, Ch. 6, pgs. 35–40, from *The Role of Leucocyte Depletion in Blood Transfusion Practice* (1988).

It is of utmost importance in designing leukodepletion strategies in which one goal is to obtain good recoveries of platelets and RBCS, to achieve separations without activating platelets or complement. It is also important that any coatings utilized to enhance the separations not be leached into solution, since the recovered cells are intended for intravascular administration to patients. One approach embodies a filter composed of a porous polymer material with continuous pore structure having a coating combining a nitrogen-containing functional group with a polyethylene oxide chain having 2–15 repeating units (See Jap. Kokai Patent Application No. Hei 5[1993]-194243). This material is said to entrap leukocytes while giving high yields of platelets.

The use of polyalkylene oxide polymers is well-known in the construction of biocompatible materials, because of its low biological activity in activating cellular and humoral components of blood, and in stimulating immune responses. However, the inertness of the polyalkylene oxide polymers may also interfere with the degree of separation that can be obtained with cell separation filters, unless combined with functional groups that enhance separation parameters. A suitable combination of coating components has not heretofore been developed which is efficacious for cell separations from whole blood as distinct from semi-purified cell suspension mixtures.

SUMMARY OF THE INVENTION

Most blood available as a source for cell separation is whole, and not pre-fractionated. It generally is packaged in one unit (approximately 350–450 ml) plastic bags and is citrated to prevent clotting. Once blood becomes outdated for use in fresh transfusions, it may be fractionated. It would be highly desirable to be able to leukodeplete and separate platelets and RBC from such blood stores directly and immediately rather than wait until it is partially fractionated.

In carrying out cell separations according to the present invention, a specimen containing a mixture of blood cells either in the form of a blood fraction or subfraction, or whole blood itself is contacted with cell separation means consisting of a filter having a coating of chemical structure herein defined, removing the cell separation means to which leukocytes have adhered, thereby separating leukocytes from the red blood cells and platelets. In a preferred embodiment, the cell separation means is a filter, through which the blood or other cell mixture is passed, with the result of removing leukocytes without substantial loss of platelets and red blood cells. In this way a transfusable unfractionated blood can be prepared which is fully functional upon administration, but with a greatly reduced risk of adverse immunologic events.

Accordingly, it is an object of the present invention to provide blood cell fractionation means for removing leukocytes from whole blood while permitting recovery in high yield of platelets, plasma, and red blood cells. It is a further object of the present invention to obtain efficacious cell fractionation through a filter without leaching of coating materials which facilitate the differential separation. It is a further object to be able to coat filters and other cell fractionation means so that permanency is attained without covalent interaction with the filter matrix itself, requiring particular functional groups which may interfere with or defeat the object of differential cell separation. It is still a further object of the present invention to provide an improved plasma or platelet collection apparatus.

To this end, in an embodiment, the present invention provides a blood filtration device comprising a housing defining an interior periphery. A rotating structure is mounted within the interior periphery and defines with the housing an annular gap on the interior periphery. An inlet fluid path is provided for allowing a blood product to flow into the annular gap. The rotating structure includes an exterior surface that includes a filter membrane. The filter membrane has a coating thereon comprising an insitu condensation product of a first electrophilically active, high molecular weight polyalkylene oxide and a second high molecular weight bifunctional diamino-polyoxyalkylene derivative.

In another embodiment a blood filtration device is provided comprising a housing and a permeable filter structure having a coating thereon comprising a polymer of a high molecular weight tetraacrylatepolyalkylene oxide polymerized by exposure to radiation, the permeable filter being located in the housing and being rotatable about an axis. An annular gap is located between the housing and the permeable filter structure having a liquid inlet port connectable to a blood supply. A drive member is provided to rotate the filter structure at a speed sufficient to create a shear rate.

In yet another embodiment, a method of separating cells is provided. The method comprises conveying a fluid suspension having at least one biological cellular component into a gap defined between a microporous filter membrane and an inside wall of a stationary housing, the filter membrane having a coating thereon, the coating being a copolymer of an electrophilically active, high molecular weight polyalkylene oxide compound and a high molecular weight bifunctional diamino-polyalkylene oxide, and rotating the filter membrane relative to the housing to create movement of the fluid suspension within the gap.

The present invention also provides a system for separating filtrate from a fluid suspension, the system comprising a housing body having a hollow interior and an inner surface; a rotor member rotatable within the interior of the housing body, the rotor member having an outer surface spaced from the inner housing surface to define a gap therebetween; a microporous filter membrane attached to the outer surface of the rotor member for common rotation therewith, the filter having a coating thereon comprising an irradiated condensation product of a high molecular weight tetraacrylate oxide; and a device for rotating the rotor member.

The present invention provides blood cell fractionation means comprising a device for the collection of plasma or platelets including a filter matrix which is coated with a chemical condensation product, prepared by reaction insitu of a first electrophilically active, high molecular weight polyalkylene oxide, and a second high molecular weight polyalkylene oxide derivative, which is either a tetraaminopolyalkylene oxide or a bifunctional dihydroxy- or diamino-polyoxyalkylene derivative, or combination thereof. Alternatively, in another embodiment, the coating may be an isopolymer of a high molecular weight tetraacrylatepolyalkylene oxide, polymerized by exposure to radiation.

The condensation reaction occurs insitu, i.e. after one polymer is dried onto the filter matrix, the second polymer is then contacted with the matrix, and the condensation reaction occurs spontaneously at a temperature between 5 degrees and about 200 degrees centigrade. The electrophilically active, high molecular weight polyalkylene oxide compound has the general structure Y-PEO-R-PEO-Y wherein Y is a reactive moiety selected from an oxycarbonylimidazole, tresyl-, tosyl-, N-hydroxysuccinimidyl, and p-nitrophenyl-activated esters; acrylates; glycidyl ethers; and aldehydes. The oxycarbonylimidazole leaving group is preferred, as will be apparent from the detailed specification, R is a spacer molecule (a chemical backbone) consisting of either bisphenol A (4,4'-isopropylidene diphenol) or bisphenol B (4,4'-butylidene diphenol) and PEO stands for polyalkylene oxide.

In the method of preparing the cell fractionation means of the present invention, a first polymer comprising an electrophilically active, high molecular weight polyalkylene oxide compound, having terminal leaving groups as indicated herein above, oxycarbonylimidazole being preferred, is applied to the surface of the cell fractionation means matrix, then drying the first polymer onto the matrix, followed by applying a second polymer consisting of either a tetraamino-, a diamino- or a dihydroxy-polyalkylene oxide, or combination thereof. The reaction between the polymers occurs spontaneously, and an incubation at a temperature from about 5 degrees to about 200 degrees Centigrade is continued for a time sufficient to obtain substantial completion of cross-linking.

BRIEF DESCRIPTION OF THE DRAWINGS

FIG. 1 is a perspective view, partially broken away, of a plasma collection apparatus of the present invention.

FIG. 2 is a side sectional view of the apparatus of FIG. 1.

FIG. 5 is a schematic of the chemical structure of the polymers of a preferred embodiment.

FIGS. 7a and 7b illustrate the relative platelet recovery obtained with PEO-coated and uncoated Asahi R-2000 filters.

FIGS. 11a and 11b illustrate scanning electron micrographs of an uncoated PES membrane and a PEO-coated PES membrane illustrating cell binding pursuant to Experiment 7.

DETAILED DESCRIPTION OF THE PREFERRED EMBODIMENT

Figure 3:
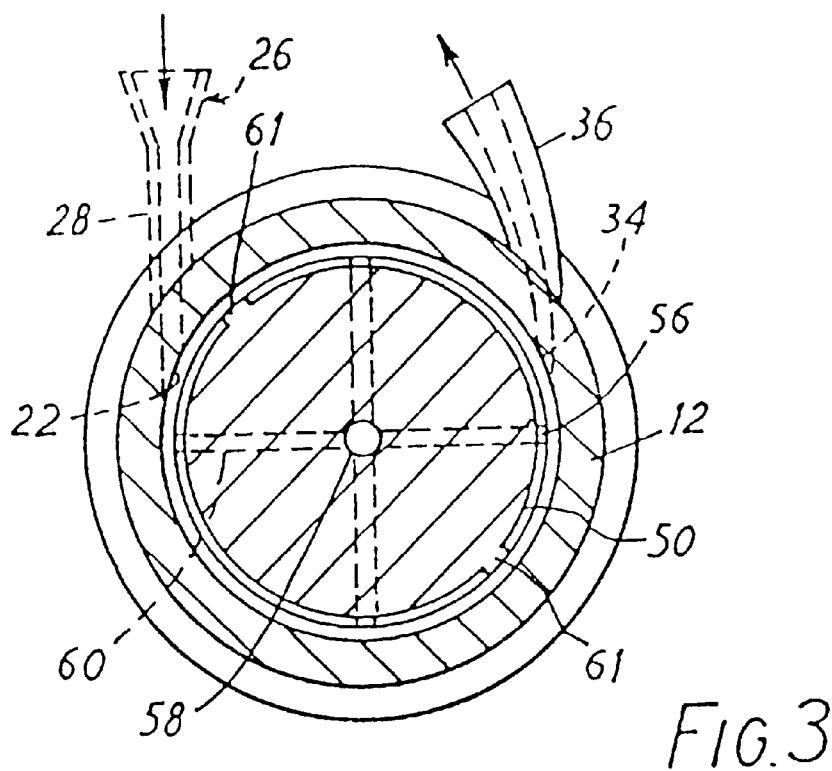
FIG. 3 is a top sectional view of the apparatus of FIG. 1 taken along lines 3—3 of FIG. 1.

The present invention comprises a system for concentrating and collecting plasma or platelets. The system includes a membrane having a coating applied to it which changes its surface properties with respect to cellular adherence of blood cell containing fluid coming into contact therewith.

The use of this type of membrane in plasma or platelet pheresis system provides a number of advantages. These advantages, over traditionally used membranes, include a reduction of plasma protein adsorption (fibrinogen/albumin). Additionally, there is reduced platelet binding after exposure to whole blood. Moreover, there is reduced in-vitro cell adhesion after exposure to whole blood, or in culture. Still further, there is negligible platelet activation and limited complement activation.

Such systems and methods for separating constituents of blood typically subject a thin flow sheet of blood to force for a sufficient time to create a concentration gradient of blood constituents while concurrently establishing high shear across the flow. A moving membrane in contact with the flowing blood and concentric with a spinning axis generates both centrifugal force and high shear on the blood flow through viscous drag. The membrane concurrently filters the desired medium solely from the adjacent flowing mass. Radial migration of cellular matter outwardly causes replenishment of light filtrate at the membrane surface to maintain the concentration gradient despite constant recovery of filtrate. The thin flow sheet is configured as an annulus between a rotating member, concentric about a central axis, and a stationary concentric shear wall, and moves longitudinally between entry and exit regions as well as circumferentially about the member. The filtrate, essentially free of higher density constituents, passes readily through the membrane and via the interior of the rotating member into an outflow path.

Usage of a rotating concentric filtration membrane, of the present invention, that is bounded by a concentric shear wall is applicable to a number of systems for separating liquid suspensions. High rotational rates in association with small gaps generate flow in which a radial concentration gradient and high shear are both obtained.

Examples of devices that can be used pursuant the present invention, using the membrane described herein, are set forth in U.S. Pat. Nos. 5,034,135 and 5,194,145 the disclosures of which are incorporated herein by reference.

By way of example, and not limitation, a preferred system 10 is illustrated in FIGS. 1–4. The system 10 includes a generally cylindrical housing 12, mounted concentrically about a longitudinal, vertical central axis, and an internal rotary spinner 14 also mounted concentric with the central axis and rotatable concentrically withing the cylindrical housing 12. The boundaries of the blood flow path are defined by the interior surface of the housing 12, and the exterior, spaced apart, surface of the rotary spinner 14.

Whole blood is fed from an inlet conduit 20 through the inlet orifice 22 which directs the blood into the blood flow entrance region in a path tangential to a circumference about the upper end of the rotary spinner 14. The inner wall 24 of the housing 12 lies in a right circular cylinder spaced at a uniform distance. The bottom end of the cylindrical housing 12 includes an exit orifice 34, the outer edge of which lies along a tangent to an interior circumference within an exit region at the lower end of the shear gap. At the tangents along which the inlet orifice 22 and exit orifice 34 lie, the circumferential flow velocity about the spinner 14 substantially matches the input and output flow rates to reduce acceleration and deceleration effects in an optimized design.

Figure 4:
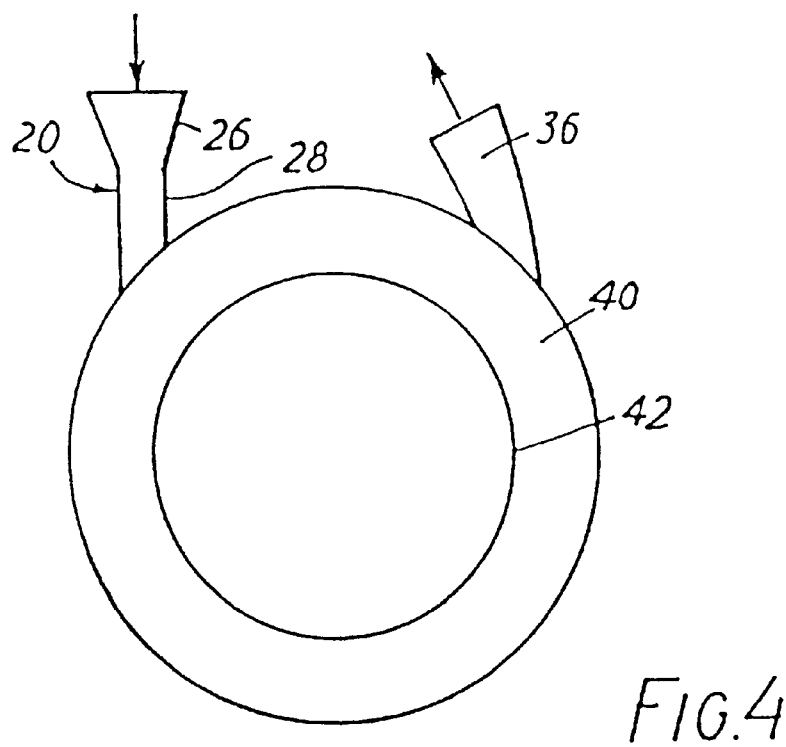
FIG. 4 is a top sectional view of a portion of the apparatus of FIG. 1, taken along lines 4—4 of FIG. 1.

As illustrated in FIGS. 3 and 4, the inlet flow of blood passes first through a converging section 26 and then through a straight section 28 having a length at least five times as the cross-sectional dimension of the inlet orifice 22. The exit orifice 34 couples to a curved diverging channel 36 which is so shaped as to avoid the introduction of a curvature of opposite sense to the flow within the housing 12, thus providing an alternative example of the manner in which flow may be achieved for either inlet or outlet orifices.

The cylindrical housing 12 is completed by an upper end cap 40 having an end boss 42, the walls of which are nonmagnetic, and a bottom end housing 44 terminating in a plasma outlet orifice 46 concentric with the central axis. The rotary spinner 14 is mounted in a vertical position between the upper end cap 40 and the bottom end housing 44. The spinner 14 comprises a shaped central mandrel 50, preferably of a light weight, strong, impermeable synthetic resin material such as high density polypropylene.

The outer surface of the central mandrel 50 is shaped to define a series of spaced apart circumferential grooves 52 separated by annular lands 54 which lie uniformly in the plane of the cylindrical outer periphery of the mandrel 50. The surface channels defined by the circumferential groves 52 are interconnected by four longitudinal grooves 56 regularly spaced in quadrants about and extending almost the entire length of the mandrel 50. At each end of the mandrel 50, these groves 56 are in communication with a central orifice or manifold 58 (best seen in FIGS. 2 and 3) concentric with the central axis, via one of a set of four radial conduits 60 disposed in the same quadrant positions. The grooves 56, orifice 58, and conduits 60 are of sufficient cross-sectional area to avoid imposing a restriction on the flow of filtrate. Also, the circumferential grooves 52 and longitudinal grooves 56 are large enough in cross-section so that there is no substantial difference in pressure drop for fluid regardless of where it transfers through the membrane.

Two longitudinal lands 61 extend along the mandrel 50 in symmetrical spacing to the longitudinal grooves 56. Thus the mandrel 50 is inherently balanced about its central axis and may be spun at high speed without instability.

The surface of the rotary spinner 14, which is about 3" (7.5 cm) in length, is covered by a cylindrical membrane 62. The membrane 62 is constructed from the matrix material discussed in detail herein.

At its upper end, the rotary spinner 14 is mounted in the upper end cap to rotate about a pin 64 which is press fit into the end cap 40 on one side, and seated within a cylindrical bearing surface 65 in an end cylinder 66 attached to or forming an integral part of the rotary spinner 14. The lower end of the pin 64 protrudes into a small chamber adjacent the bearing surface 65 so that the pin end does not dig into the end cylinder 66. The end cylinder 66 is partially encompassed by a ring 68 of magnetic material utilized in indirect driving of the spinner 14.

A drive motor 70 exterior to the housing 12 is coupled to turn an annular magnetic drive member 72 which partially surrounds the nonmagnetic end cap 40. The drive member 72 includes at least a pair of internal permanent magnets 74 in spaced apart, facing relation to the magnetic ring 68 in the end cylinder, but centered below the midpoint of the ring 68 along the vertical central axis. As the annular drive member 72 is rotated, magnetic attraction between the ring 68 interior to the housing 12 and the magnets 74 the magnets 74 exterior to the housing locks the spinner 14 to the exterior drive, causing the spinner 14 to rotate without slippage. Moreover, the vertical displacement between the magnets 74 and ring 68 imposes a constant downward force on the spinner 14.

At the lower end of the rotary spinner 14, the central outlet orifice 58 communicates with a central bore 76 in an end bearing 78 concentric with the central axis. The end bearing 78 is seated in the bottom end housing 44 and includes an intermediate tapered side surface 79 that diverges in the downward direction. An end bearing seat is defined by a narrowed concentric throat or internal shoulder 80 forming the lower edge of a central opening 82 in the lower end of the bottom end housing 44.

The central opening 82 communicates with the plasma outlet orifice 46. A radial bearing surface is defined by the cylindrical upper portion 83 of the end bearing 78, which fits within a mating surface of the end central opening 82. As the spinner 14 rotates the end bearing 78 is mechanically urged downwardly on the should 80 region by the magnetic coupling, forming an end seal.

The lower end of the spinner 14 body also includes a concave surface 84 facing the opposing end wall, to increase the volume about the end bearing 78. This configuration at the lower end of the spinner aids the capture of entrained air and the formation of a stable bubble about the lower rotary seal to enhance the integrity of the seal and limit heat transfer to the blood flow that might contribute to hemolysis. Minium blood-air interface areas exist at both ends of the housing 12, when bubbles are trapped at these regions, because the longitudinal ends of the spinner 14 are disposed close to the adjacent end walls (e.g. here less than 0.02" (0.05 cm). The concave surface 84 need not be employed. In addition the reduced diameter of the end cylinder 66 relative to the spinner 14 aids both in the capture of air and in the reduction of gap size without increasing shear stress on the blood. Turbulence in the end regions can induce hemolysis into the plasma retained in the blood flow mass and intensify sealing problems.

In operation, with the rotary spinner 14 rotating at the 3600 r.p.m. rate chosen in this practical example, whole blood is fed through the inlet orifice 22 in a low acceleration and deceleration flow path that commences with tangential entry into the shear gap between the outer surface of the spinner 14 and the inner wall 24 of the housing 12. Circumferential velocity is imparted by viscous drag on the blood layer that is in contact with the outer cylindrical membrane 62 on the rotary spinner 14, so that the spinning action creates a flow about and with the spinner 14.

Ingress of whole blood is preferably at a rate matching the average circumferential velocity in the region of the inlet orifice 22, so as to avoid abrupt shock and sudden acceleration. Although matching of blood inlet flow in this manner is desirable, it is not necessary to maintain a precise relationship because in practice no adverse effects have been observed with a range of inlet flow rates and geometries in plasmapheresis systems of the general character of FIG. 1. The action of viscous drag then provides acceleration, without damage to the blood. Stabilization is quickly achieved as the internal volume between the inner walls of the housing 12 and the outer surface of the rotary spinner 14 is filled.

Referring now specifically to the membrane 62, and more specifically to the material for construction the membrane, the membrane 62 has a microporous structure with a coating applied to it. The coating changes the surface properties of the membrane with respect to cellular adherence of blood cells containing fluid.

Since the coating of polymers and the chemical reactions which are carried out to create a generally molecularly continuous polymeric surface on the filter matrix does not require covalent or noncovalent interaction with any chemical moiety present on the native surface of the matrix, the coating itself is independent of the chemical and physical identity of the matrix. Thus, the coating is intended to be universally applicable to any filter and membrane filters available in the cell separation art. Examples include, without limitation, filters having a high glass content, as in glass fiber mats, filters with less or no glass content such as a filter comprising a mixture of glass and polyester, and a polyethylene terephthalate platelet filter coated with hydroxyethylmethyl-methacrylate and membrane filters made from polyester terephtalate (PET), nylon, polyethersulfone (PES), polytetrafluoroethylene (PTFE, from Goretex), polysulfone (PS), mixed ester of nitro-cellulose, cellulose triacetate (CTA), polyacrylonitrile (PAN), polyethylene, polypropylene and polyvinylidene difluoride (PVDF).

If used in the filter structure, the filter housings for the filter which may be conveniently used are manufactured conventionally. Examples of such housing are Swinney plastic manifolds manufactured by Gelman, pediatric Enterprise Housings, or Intermediate Enterprise Housings. The correct size correlations of filters to correspondingly suitable housings will be apparent to those skilled in the art.

The only limitation applicable to the blood cell fractionation means is a surface which is incompatible with the polymer solutions. Even in the instance where molecular wetting is not obtainable with the polymer solutions, techniques utilizing emulsifiers and phase penetrants may be useful in achieving adequate coating. To Applicants' knowledge, none of the blood cell fractionation filter materials currently available commercially are to be excluded from applicability to the present invention.

For manufacturing ease, chemical condensation reaction of the respective polymers is carried out insitu, i.e. a first free polymer is laid down on the matrix and dried, and then the second is contacted in solution with the matrix. The ensuing reaction then produces a skin-like sheet or layer of copolymerized material at the surface of the matrix. This reaction in the preferred embodiment proceeds spontaneously at temperatures generally in the range of 5 to 200 degrees centigrade. It is evident that the time for completion of the reaction will be slightly longer at cooler temperatures than for higher temperatures in accordance with kinetic thermodynamic principles. Generally, these reactions may be carried out at ambient temperatures, as disclosed in the Examples, but very little experimentation will be required by those skilled in the art to adjust the reaction times to a particular desired temperature of reaction.

The first polymer to be contacted with the filter (as by soaking to saturation) is a high molecular weight electrophilically active polyalkylene oxide. Electrophilically active means that a polyalkylene oxide polymer contains a group contained in a second polymer. In a particularly preferred embodiment, a primary amine serving as a nucleophile, reacts with the carbonyl group of the imidazole-polyalkylene oxide polymer to form, upon reaction, an N-substituted carbamate bond where the carbonyl moiety from a cross-linker is incorporated into the new bond. These polymer entities must be high molecular weight, in the range of about 13,000 to 24,000 daltons, preferably about 20,000 daltons. Thus the preferred molecules shown in FIG. 5 for reaction on matrices will have n values of about 100–225. High molecular weight, as herein defined, is important because it was determined empirically that lower molecular weight materials tended to markedly reduce platelet recovery.

A first electrophilic polyalkylene oxide polymer will have a terminal leaving group reactive with an amine or hydroxyl containing second polyalkylene oxide. Suitable leaving groups on the first polymer for achieving acceptable chemical condensation are imidazoyl-, tresyl-, tosyl-, acryloyl-, and N-hydroxysuccinimidyl-. Additionally the structure of the electrophilic polymer can further be defined by the general expression: Y-PEO-R-PEO-Y, wherein Y is selected from the following group singly or in combination: oxycarbonylimidazole; tresyl-, tosyl-, N-hydroxysuccinimidyl-, and p-nitrophenyl-activated esters; acrylates; glycidyl ethers; and aldehydes, and R is a spacer defined as a backbone to which the two polyalkylene arms are attached, consisting preferably of bisphenol A or B. Bisphenol A is preferred, as shown in the structure of FIG. 5.

We have also determined that the imidazole derived polyalkylene oxides give the best results, perhaps because the reaction proceeds somewhat better, or perhaps because the oxycarbonyl-imidazole moiety adheres better to the polymeric surface than the other derivatives. In any event, Applicants do not wish to be bound to any particular theory, but disclose the result as a guide to those experienced in the art. In general, polyalkylene means polyethylene or polypropylene, since these are the most common polyalkylene oxides used in biocompatibility applications. However, in general, polyalkylene means polyethylene or polypropylene, since these are the most common polyalkylene oxides used in biocompatibility applications. However, applicants consider other polyalkylene oxides up to polybutylene oxide to be within the scope of the invention.

In a lesser embodiment, a tetra or diacrylate terminal derivative of polyalkylene oxide may be isopolymerized by first contacting with the matrix, followed by irradiation with UV light or gamma rays to effect free radical polymerization. The resulting coated filter matrix is leukodepletive with adequate recoveries of platelets and red bloods cells, but is not a efficacious as the other embodiments of the invention set forth herein.

In the method of the present invention, insitu chemical condensation is carried out to mold the copolymer skin to the contours of the membrane matrix. It is important that the electrophilically active polyalkylene oxide by deposited on the matrix first, dried, and then further contacted with the second amino or hydroxy-containing nucleophilic polymer. This teaching arises from empirical observation as to which method steps give best results in terms of platelet and RBC recovery, and leukodepletion, and the mechanistic or molecular basis for the observation is unknown to Applicants. In the drying step, drying in ambient air is adequate to "fix" the polymer in position, but light to moderate heat at various humidities down to less than 5% humidity or in vacuo may be applied to hasten the drying step in a manufacturing context.

The copolymerized material is highly stable to leaching, as shown in the Examples. In contrast to unreacted single polymer labeled with $^{125}I$, which is readily leached into filtrate, the fully copolymerized material made according to the method of the present invention is highly resistant to leaching, and is stable for preparation of therapeutically acceptable cell fractions.

In the method of separating cells according to the invention, a cell suspension or whole blood is filtered through the filter having the polymer coating as disclosed. More generalized methods of contacting the filter with a cell containing fluid are contemplated by this invention as well. For example, rapidly flowing blood or blood fractions across a stationary filter.

Other advantages of the present invention will be apparent from the Examples which follow.

EXAMPLE 1

Figures 6A, 6B:
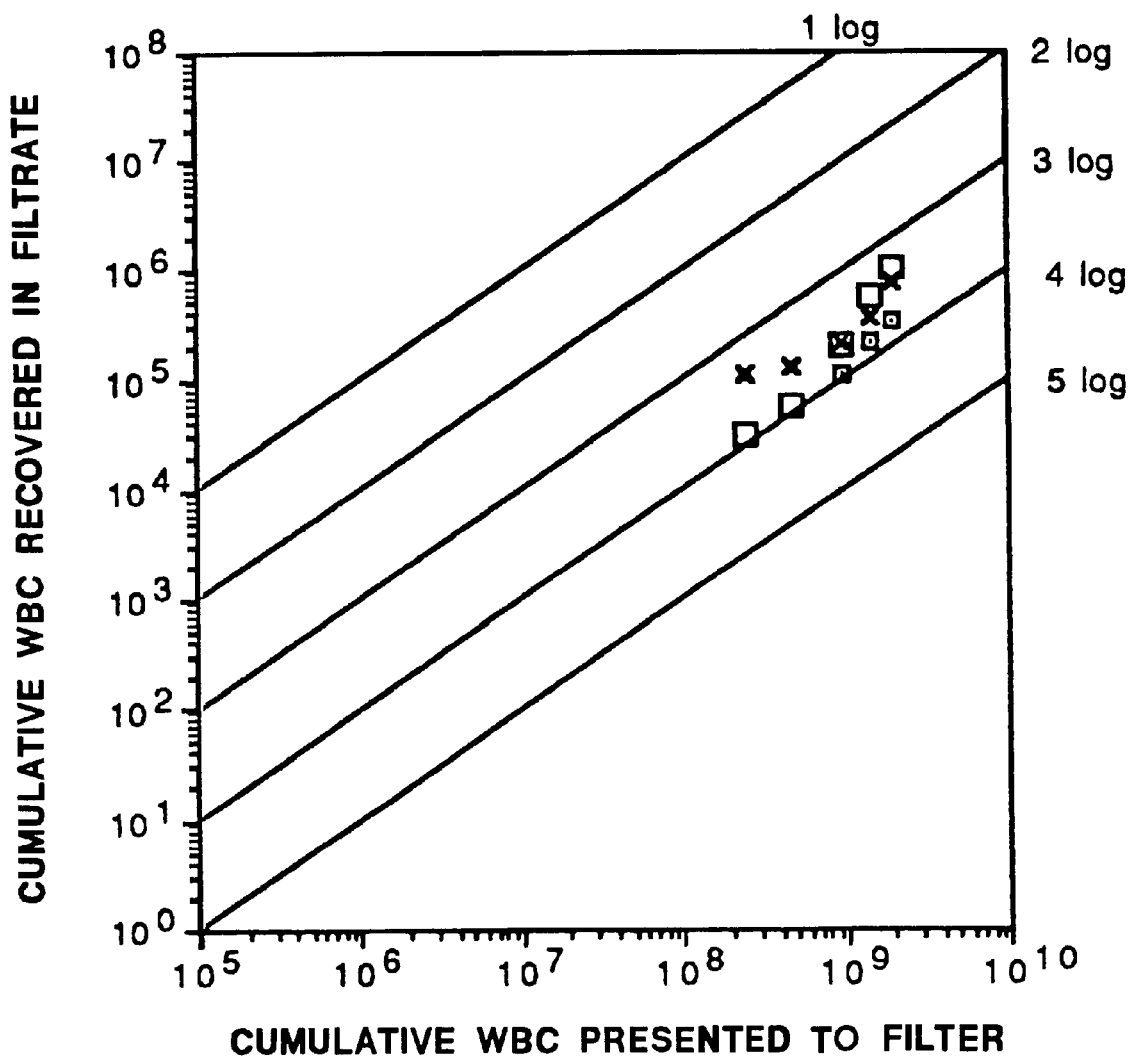
FIGS. 6a and 6b illustrate the relative WBC depletion for PEO-coated and uncoated Asahi R-2000 filters. Log depletion is illustrated on the right side of the figure.

Oxycarbonyl imidazole-polyethylene oxide (Imz-PEO) with an average molecular weight of 20K daltons (Sigma Chemical Company), was first coated onto existing Asahi R-2000 filters by soaking the filter mats in a 2.5% solution of Imz-PEO. The mats were dried under vacuum. The amount of Imz-PEO bound to the mat was about 70 mg/gram of filter mat. Dried Imz-PEO-coated mats were cross-linked with bis[polyoxyethylene bis(amine)] (TAPEO,20K daltons), obtained from Sigma Chemical Company. The cross-linking reaction was performed by soaking the Imz-PEO-coated mat in a water-methanol (1:1) solution of TAPEO at a 2.5 to 5.0 fold molar excess over the bound Imz-PEO. The reaction was allowed to proceed for at least 24 hours. The mats were dried again under vacuum. Dried cross-linked mats were washed extensively by soaking with water several times to remove any unbound PEO. After the final wash, the mats were dried again under a high vacuum. Cross-linked mats were stored at room temperature until used for blood filtration. In this example, the mats were used with pooled (ABO compatible), one day old, human whole blood, obtained from Interstate Blood Bank. The pooled whole blood was suspended about 3 feet above the filter unit, and the blood was allowed to flow by gravity through each of the different types of PEO-filter mats. An aliquot of whole blood (20 to 30 ml) was taken from the unit before filtration and was saved as a control (pre-sample). The filtered blood (post samples) and the pre-samples were counted for platelets with a Sysmex K-1000 cell counter and the WBC concentrations were determined by staining WBC nuclei (after lysing the sample) with propidium iodide and analyzing the stained samples with a FacScan flow cytometer. The results of WBC depletion and platelet recovery are illustrated in FIGS. 6 and 7 respectively. The degree of platelet recovery ranged from 75 to 80% with Imz-PEO-coated mats vs 0.5% for the uncoated mats. The amount of WBC depletion remained unchanged, in the range of 3 to 4 logs for all of the mats (Table 1).

TABLE 1

Filtration of Whole Blood Through PEO-Coated and Uncoated Asahi R-2000 Filter Mats

| SAMPLE | WBC Depletion Depletion (log) | PLATELET Recovery (% Pre) |
|---|---|---|
| Imz-PEG (no cross-linking) | 3.25 | 80 |
| 2.5x Cross-linked (Mat #1) | 3.39 | 74 |
| 2.5x Cross-linked (Mat #1) | 3.75 | 74 |
| Uncoated | 3.73 | 0.5 |

EXAMPLE 2

In this experiment, variables such as the age of the blood and the storage temperature were evaluated. The same PEO-coated Asahi R-2000 filter mats described above were used for these studies. Units of whole blood were obtained fresh in-house, and stored at room temperature until used (about 2 hours). One day old blood, stored at room temperature or 4 degrees centigrade, were also obtained from Interstate Blood Bank. Each unit was allowed to flow through each PEO-coated filter and the samples were analyzed as described above. The results, summarized in Table 2, suggest that despite the utilization of various units of whole blood stored under different conditions, the yield of platelets obtained from PEO-coated Asahi R-2000 filters is dramatically improved (68 to 83%) as compared to uncoated mats (2%).

TABLE 2

Filtration of Whole Blood Through PEO-Coated and Uncoated Asahi R-2000 Filters

| SAMPLE | WBC Depletion Depletion (log) | PLATELET Recovery (% Pre) |
|---|---|---|
| PEO-Cross-Linked Mats: | | |
| Interstate-RT (1 day old) #1 | −2.63 | 83 |
| Interstate-RT (1 day old) #2 | −4.01 | 68 |
| Interstate-4° C. (1 day old) #3 | −3.22 | 80 |
| In-house-RT (~2 hrs) #1 | −3.25 | 76 |
| Uncoated Mats: | | |
| Interstate-RT (1 day old) #1 | −3.50 | 02 |

EXAMPLE 3

In this example, tetraacrylate PEO derivatives were obtained either from Shearwater Polymer Inc., or synthesized from PEO 20K daltons obtained from Sigma (FIG. 5). The acrylate-PEO derivatives were coated onto composite mats by the same procedure as described in example 1. The dried acrylate-PEO-coated mats were subjected to gamma irradiation at a low dosage (2 megarads) to facilitate cross-inking of the PEO coating. The dried, coated mats were cut into circles of about 1.50 inches, and 3 layers of mats were placed into a small pediatric-sized housing for whole blood evaluation. One day old pooled whole blood, obtained from Interstate Blood Bank was used. The final volume of blood used per housing was about 75 ml. The results of these experiments, summarized in Table 3, demonstrate the improvement in platelet recovery upon coating mats with the PEO derivatives. However, the improvement in platelet recovery seen with the acrylate PEO derivatives is not as good as was observed with the Imz-PEO-coated mats.

TABLE 3

Filtration of Whole Blood Through Various Acrylate-PEO-Coated and Uncoated Composite Filters

| SAMPLE | WBC Depletion Depletion (log) | PLATELET Recovery (% Pre) |
|---|---|---|
| Uncoated | −2.20 | 43 |
| Sigma-Tetra-Acrylate-20K | −1.62 | 69 |
| Shearwater-Tetra-ACR-14K | −2.04 | 56 |
| Sigma-Tetra-Acrylate-20K Irradiated | −1.64 | 65 |
| Shearwater-Tetra-ACR-14K Irradiated | −1.91 | 65 |

EXAMPLE 4

The stability of these PEO coatings was investigated using radioactively labeled $^{125}$I-Imz-PEO and $^{125}$I-Tetraamino-PEO. The presence of the bis phenol A units in the structure of Imz-PEO or Tetraamino-PEO derivatives permitted conventional labeling of these molecules using $^{125}$I and iodo beads (Pierce Chemical Co.). In the first set of experiments, the $^{125}$I-Imz-PEO was first coated onto the mats and was cross-linked with unlabeled Tetraamino-PEO. In the second set of experiments, unlabeled Imz-PEO was coated onto the mats and then cross-linked with $^{125}$I-Tetraamino-PEO. Each $^{125}$I-PEO-coated mat was evaluated in a Swinney housing (using a filter about 1 cm in diameter) with fresh whole blood. Four fractions of blood filtrate (~1 ml each) were collected and counted for the presence of $^{125}$I-PEO derivatives with a gamma counter. Each $^{125}$I-PEO-coated filter mat was also counted for radioactivity, before and after filtration. The amount of labeled PEO recovered on the mats after whole blood filtration varied from 87% to 95%. In contrast, 35% of the labeled Imz-PEO was leached off filter mats where no cross-linking reaction was performed.

TABLE 4

Stability of PEO-Coated Asahi R-2000 Filter Mats Measured With $^{125}$I-Imz-PEO or $^{125}$I-Tetraamino-PEO

| SAMPLE with $^{125}$I-Label | $^{125}$I-PEO-Coated Mats Recovered After Filtration (% Pre Labeled Mat) |
|---|---|
| $^{125}$Imz-PEO-Tetraamino-PEO | 95% |
| Imz-PEO-$^{125}$I-Tetraamino-PEO | 87% |
| $^{125}$I-Imz-PEO (not cross-linked) | 65% |

EXAMPLE 5

Various pre and post blood samples from the above experiments were further evaluated for complement activation by measuring C3a and C5a (by RIA) and for platelet activation by determining the percentage of platelets positive for the activation marker CD62. PLS10A platelet filters (Asahi) were included in this analysis as a control for comparison. The results for C3a and C5a is summarized in Table 5A.

TABLE 5A

C3a amd C5a Levels in Blood Exposed to PEO-coated and Uncoated Asahi R-2000 and PlS-10A Filters

| SAMPLE | C3 (ng/ml) Pre-samples | Post-samples | C5a (ng/ml) Pre-samples | Post-samples |
|---|---|---|---|---|
| Cross-linked | 952 | 1,276 | 20 | 54 |
| Cross-linked | 538 | 614 | 0 | 19 |
| Cross-linked | 857 | 1,047 | 17 | 13 |
| Cross-linked | 1,103 | 1,149 | 28 | 34 |
| Cross-linked | 610 | 619 | 15 | 15 |
| Uncoated | 319 | 248 | 29 | 19 |
| Uncoated | 686 | 716 | 15 | 11 |
| PLS-10A | 964 | 4,057 | 22 | 66 |
| PLS-10A | 839 | 2,169 | 33 | 34 |
| PLS-10A | 328 | 1,727 | 9 | 25 |
| PLS-10A | 437 | 2,572 | 4 | 26 |

High levels of C3a and C5a were found in blood samples obtained from Asahi platelet filter PLS-10A. Although these PLS-10A filters have not been used with whole blood, it appears that the PLS-10A produces at least a 2 to 4 fold increase in C3a and C5a levels as compared to the corresponding pre-samples. These levels of C3a and C5a are higher than the amount of C3a and C5a produced by the PEO-coated Asahi R-2000. These results suggest that PEO-coated Asahi R-2000 filters are more biocompatible than the PLS-10A commercial filter used for platelet concentrate.

The percent of platelets expressing the activation marker, CD62, is a sensitive measure of the extent of platelet activation. Samples of whole blood were analyzed (pre and post filtration) using a FacScan flow cytometer to determine the percentage of platelets positive for CD62. This analysis revealed (Table 5B) that no elevation in the percentage of CD62 positive platelets occurred during filtration on any of the mats investigated.

TABLE 5B

Platelet Activation in Whole Blood Samples Exposed to Various Filters

| SAMPLE | % CD62 in Pre-samples | % CD62 in Post-samples |
|---|---|---|
| Uncoated | 5.45 | 5.88 |
| Cross-linked-PEO | 4.45 | 4.78 |
| Cross-linked-PEO | 5.20 | 5.24 |
| Not Cross-linked-PEO | 5.45 | 3.27 |
| Not Cross-linked-PEO | 4.05 | 2.11 |
| PLS 10A | 5.45 | 2.10 |

EXAMPLE 6

Treatment of various membrane surfaces with polyethylene oxide (PEO) derivatives:

Two types of polyether sulfone (PES) flat sheet membranes were used. The first type of membrane (PES-2) was made by casting a solution of polyether sulfone (PES 650), polyethylene glycol (low molecular weight PEG), N-methyl-pyrrolidone and polyvinyl pyrrolidone (PVP) onto a polyester base. The second type of membrane (PES-4) was made similarly to the first but without the PVP in the casting solution and having a base instead of the polyester base.

Each membrane was cut into circles of about 1 cm in diameter. The circles were weighed, and each circle was placed into a well of a 24 well plate containing a 2.5% solution of an oxycarbonyl imidazole polyethylene oxide (Imz-PEO) with an average molecular weight of 20K daltons. The plate was placed on a circular shaker with a moderate speed, for 30 to 120 minutes, at room temperature. The membranes were removed and dried under vacuum (about 500 millitors) overnight. The amount of adsorbed Imz-PEO was about 70 mg/g of PES-2 and 44 mg/g of PES-4 membrane.

Each circle of dried Imz-PEO-coated membrane prepared above was placed into a well of a new 24 well plate containing a 2.5% water solution of bis[polyoxyethylene bis (amine)] (NH2-PEO, 20K daltons). A cross-linking reaction was performed at room temperature over the weekend. The cross-linked membrane was removed and dried again under a vacuum. Dried membranes were washed extensively with water to remove any unbound PEO. After the final wash, the membranes were dried again under a vacuum. The total amount of bound PEOs was estimated to be about 20 mg/g of PES membrane. PEO-cross-linked membranes were stored at room temperature until the analysis.

Figure 8B:
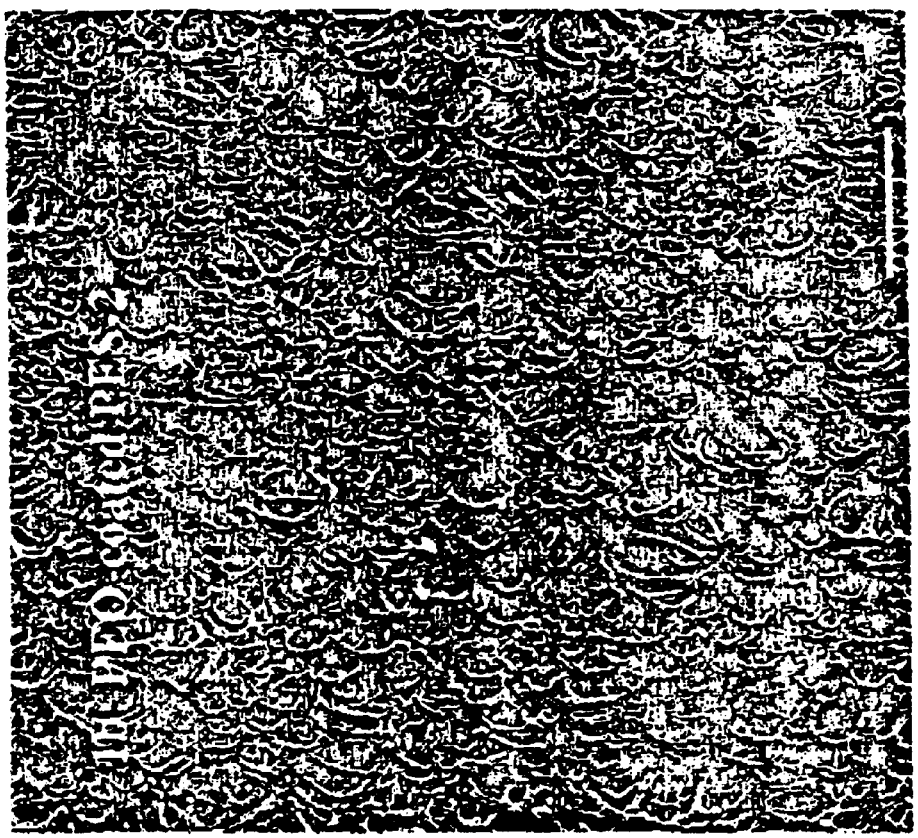
FIG. 8a illustrates a scanning electron micrograph of an uncoated PES membrane and FIG. 8b illustrates a scanning electron micrograph of a PEO-coated PES membrane.
Figure 8A:
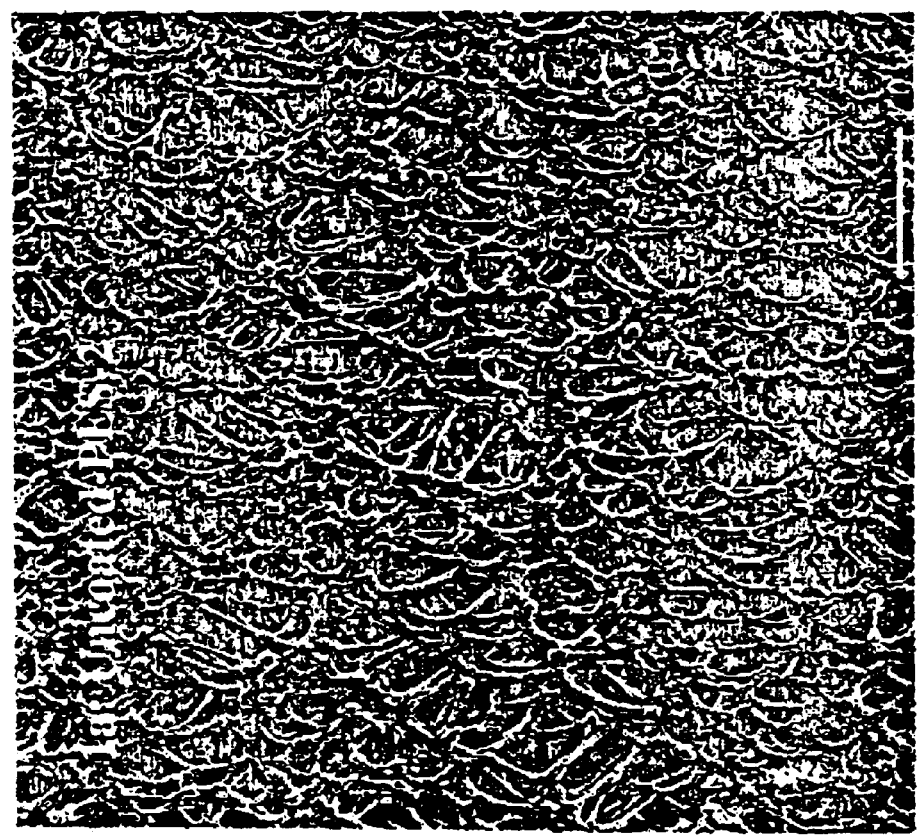
Figure 9B:
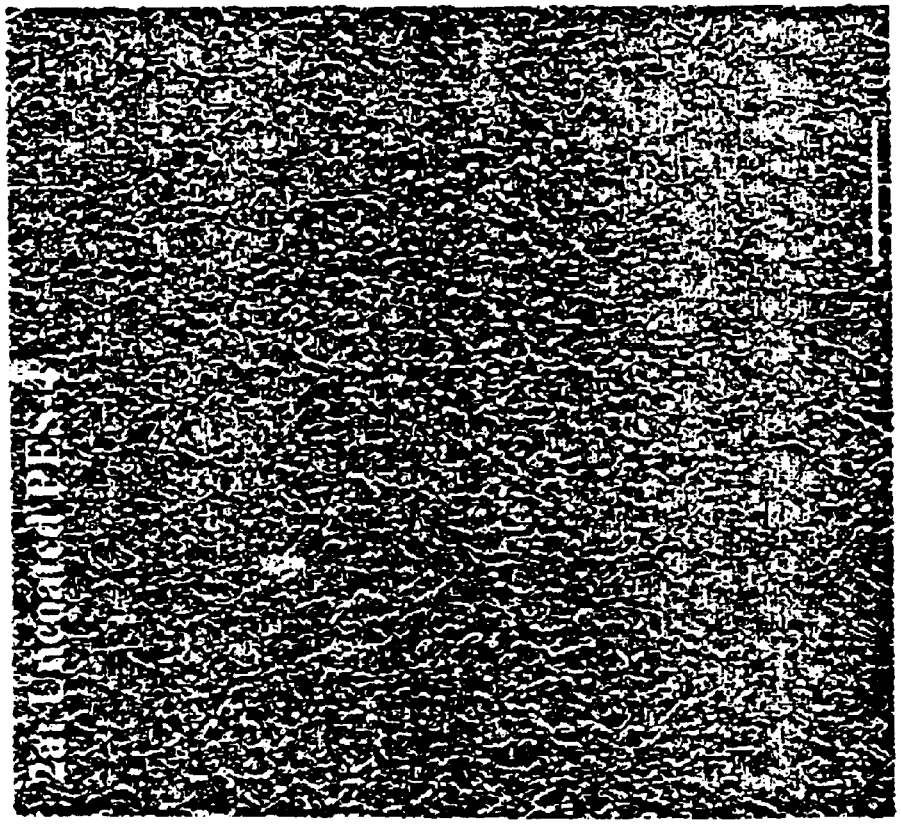
FIG. 9a illustrates a scanning electron micrograph of an uncoated PES membrane and FIG. 9b illustrates a scanning electron micrograph of a PEO-coated PES membrane.
Figure 9A:
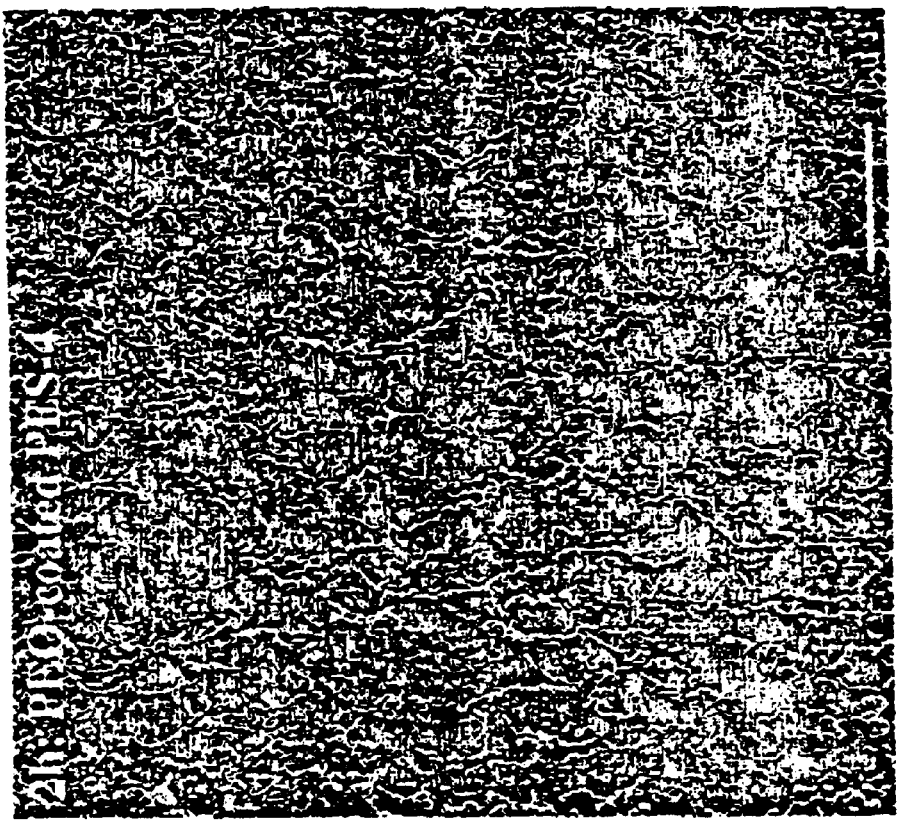

SEM Analysis of PEO-Coated PES Membranes:

PEO-coated and uncoated membranes were examined using a high resolution Scanning Electron Microscopy (SEM). The homogeneity of the coating was determined by comparing the morphology of the surface before (uncoated) and after coating (PEO-coating). The results of the SEM analysis of PES membranes are illustrated in FIGS. 8a, 8b, 9a and 9b. As shown, the architecture of the surfaces were coated with PEO (FIGS. 8b and 9b) were quiet different from the corresponding uncoated materials (FIGS. 8a and 9a).

EXAMPLE 7

The ability of PEO-coated polymers to interact with whole blood cells was evaluated with fresh whole blood.

1. Effect of PEO Coating on Platelet Adhesion to PES Membranes:

Citrated or heparinized fresh whole blood obtained from healthy donors was divided into three equal fractions. ADP stock solutions were added (1 uM and 10 uM) to the first two fractions to produce blood with activated platelets, and the blood without ADP was used as a non-activated control.

Small pieces of PES membranes, with and without PEO coating, were incubated with fresh whole blood (with and without ADP) at room temperature for 20 minutes in wells of a 24 well-plate. During the incubation, the plate was placed on an orbital shaker set at 250 to 350 RPM. At the end of the incubation, the membranes were removed, washed with PBS and were divided into 2 equal groups. The first group was stored at 4° C. in 1% paraformaldehyde solution and were used for assessing the amount of adsorbed fibrinogen. The second group was stored at 4° C. in 2% glutaraldehyde solution for further analysis.

The blood fractions were analyzed for platelets and WBC with a Sysmex cell counter. The results of platelet recovery in blood samples are summarized in Table 6A. As shown in Table 6A, the level of platelets recovered from blood samples after exposure to PEO-coated PES is consistently higher than in blood samples (with and without ADP) exposed to the uncoated membranes.

TABLE 6A

Effect of PEO Coating on Platelet Binding to PES Membranes with Fresh Whole Blood (Data Is Expressed as % Recover of Platelets in Blood after Exposure to Membrane Filters)

| Membranes | PES-2 Uncoated | PES-2 PEO-Coated | PES-4 Uncoated | PES-4 PEO-Coated |
|---|---|---|---|---|
| | | Donor 1 | | |
| no ADP | 78 | 88 | 77 | 87 |
| 1uM ADP | 90 | 95 | 86 | 102 |
| 10uM ADP | 86 | 94 | 77 | 89 |
| | | Donor 2 | | |
| no ADP | 92 | 99 | 87 | 104 |
| 1uM ADP | 96 | 99 | 87 | 112 |
| 10uM ADP | 91 | 97 | 99 | 112 |

2. Binding of Anti-human Fibrinogen Antibody:

The amount of fibrinogen bound to the membranes (from whole blood) was determined using a mouse monoclonal anti-human fibrinogen antibody (obtained from Biodesign). Membranes that were fixed with 1% formaldehyde were washed with PBS several times before they were incubated with radio labeled $^{125}$I-anti-fibrinogen. The incubation of $^{125}$I-anti-fibrinogen with the membranes was performed at room temperature for 90 minutes. The amount of anti-fibrinogen adsorbed was calculated from the specific activity of the antibody and expressed as nanogram (ng) of protein per surface area or weight (mg) of materials.

The preliminary results (Table 6B) indicated that the PEO coating on both PES membranes resulted in significant reduction in fibrinogen binding as determined by anti-fibrinogen binding. A 7–10 fold reduction was obtained with PEO-coated PES-2 membrane, while only 3.5 fold reduction with PEO-coated PES-4, compared to its corresponding uncoated PES-2 and PES-4, respectively.

TABLE 6B

Effect of PEO Coating on Anti-fibrinogen Binding to PES Membranes after Whole Blood Exposure (ng/cm2)

| Membranes | PES-2 Uncoated | PES-2 PEO-Coated | PES-4 Uncoated | PES-4 PEO-Coated |
|---|---|---|---|---|
| Donor 1 | | | | |
| no ADP | 249 | 30 | 42 | 10 |
| 1uM ADP | 205 | 17 | 42 | 12 |
| 10uM ADP | 199 | 26 | 44 | 12 |
| Donor 2 | | | | |
| no ADP | 214 | 32 | 38 | 14 |
| 1uM ADP | 222 | 27 | 39 | 10 |
| 10uM ADP | 300 | 29 | 44 | 11 |

3. SEM analysis of cells binding onto surfaces:

Membranes (PES-2) that were fixed with glutaraldehyde were washed with Sorenson Phosphate Buffer (SPB), dehydrated through a graded ethanol series and critical point dried. Mounted samples were sputtered and viewed in the SEI mode on the JOEL 6300F (RLB1021) field emission SEM.

Figure 10B:
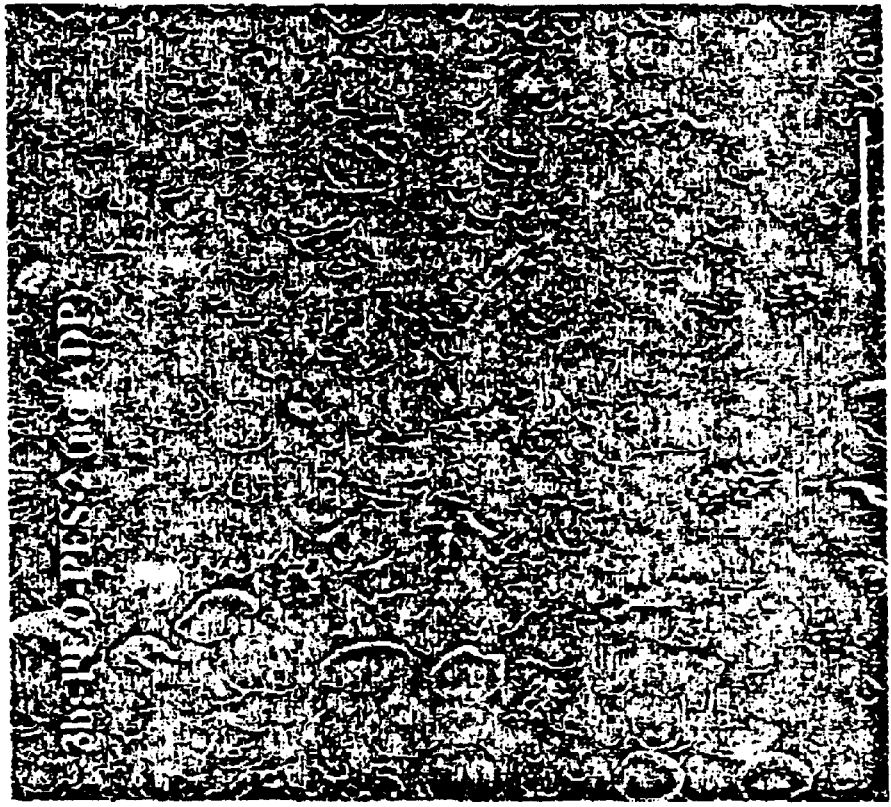
FIGS. 10a and 10b illustrate scanning electron micrographs of an uncoated PES membrane and a PEO-coated PES membrane illustrating cell binding pursuant to Experiment 7.
Figure 10A:
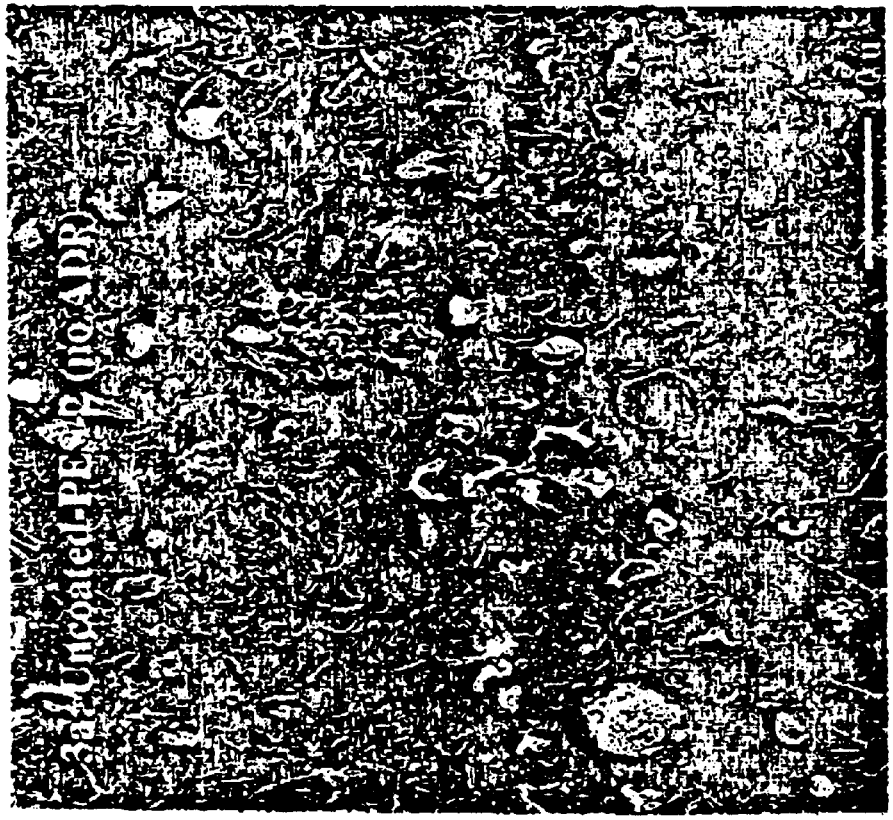

The results of the SEM analysis of these membranes are summarized in FIGS. 10a and 10b (no ADP), and FIGS. 11a and 11 (10 um ADP). As shown in FIGS. 10a and 10b, PEO-coated membranes exhibited a very low cell adhesion, compared to the corresponding uncoated membrane, when no ADP was added to blood. With blood containing 10 uM ADP, a number of activated platelets was found attached onto the surface of the uncoated membrane (FIG. 11a), compared to the PEO-coated membrane where only a few cells were found (FIG. 11b).

EXAMPLE 8

The effect of PEO coating on protein adsorption onto PES membranes (prepared in example 7 above) was also evaluated with purified human fibrinogen. Human fibrinogen (Calbiochem) was labeled with $^{125}1$Na (Dupont NEN) using iodo beads (Pierce Chemical Co.) according to manufacturer specification, and was diluted with non-labeled fibrinogen with sodium-citrate-phosphate buffer (CPB) (0.010M sodium citrate, 0.010M PBS, 0.01 M NaI and 0.02% NaN3, pH 7.4). The specific activity were adjusted to about 25–30,000 cpm per micro gram of fibrinogen. The coagulability of the radiolabeled fibrinogen was determined according to Paris et al. Reconstitution of the purified Platelet Fibrinogen Receptor. J. Biol. Chem, 260: pp10698–10707 (1985).

Flat sheet materials (circles of 1 cm in diameter) with and without PEO coating were first rinsed with saline then incubated in the fibrinogen solution for 1 hour at 37°. After incubation, they were rinsed extensively with CPB, then saline solution. Any radioactivity bound to the materials were measured in a gamma counter. The amount of protein adsorbed per unit area (or per weight of materials) were calculated using the known specific activity from the labeled fibrinogen. The results of this binding experiment are summarized in Table 7. As shown in Table 7, all PEO-coated PES membranes exhibit 4 to 5 fold reduction in fibrinogen binding. This result is in agreement with the above finding when anti-fibrinogen was used to assess the amount of bound fibrinogen from whole blood.

TABLE 7

Effect of PEO Coating on Fibrinogen Binding to PES Membranes (ng/mg of sample)

| Membranes | Uncoated (Mean ± SD) | PEO-Coated (Mean ± SD) |
|---|---|---|
| PES-2 | 451 ± 4 | 111 ± 10 |
| PES-4 | 344 ± 10 | 68 ± 4 |

EXAMPLE 9

Other types of flat sheet membranes were also used for treatment with PEO derivatives. They included a polyether terephthalate (PET), polyvinylidene difluoride (PVDF) (Millipore), mixed ester of nitrocelluloses (Millipore), PTFE with polyester backing (Goretex) and Nylon-74 membranes. These membranes were treated with PEO derivatives according to procedures described in Example 6 above. They were all evaluated with the fibrinogen binding assay according to Example 8. The results of these binding experiments are summarized in Table 8. As shown in Table 8, all PEO-coated membranes exhibited a very low fibrinogen binding compared to uncoated materials.

| | | |
|---|---|---|
| PET | 357 ± 23 | 73 ± 11 |
| Nylon-74 | 195 ± 15 | 75 ± 15 |
| Nitro-Cellulose (8) | 3378 ± 267 | 341 ± 153 |
| Nitro-Cellulose - (1.2) | 4329 ± 361 | 293 ± 71 |
| Nitro-Cellulose - (0.45) | 4463 ± 385 | 83 ± 36 |
| PTFE | 454 ± 177 | 28 ± 18 |
| PVDF | 27 ± 2 | 3 ± 0 |

What is claimed is:

1. A blood filtration device comprising:

a housing defining an interior periphery;

a rotating structure mounted within the interior periphery and defining with the housing an annular gap within the interior periphery;

an inlet fluid path for allowing a blood product to flow into the annular gap;

the rotating structure including an exterior surface that includes a filter membrane; and the filter membrane having a coating thereon comprising an insitu condensation product of a first electrophilically active, high molecular weight polyalkylene oxide and a second high molecular weight bifunctional diamino-polyoxyalkylene derivative, wherein the polyalkylene oxides can comprise up to polybutylene oxide.

2. The blood filtration device of claim 1 wherein said first electrophilically active, high molecular weight polyalkylene oxide compound has the general structure Y-PEO-R-PEO-Y wherein Y is a reactive moiety selected from the group consisting of oxycarbonylimidazole; tresyl-, tosyl-, N-hydroxysuccinimidyl-, and p-nitrophenyl-activated esters; acrylates; glycidyl ethers; and aldehydes, wherein R is a spacer selected from compounds containing carbon, nitrogen, oxygen, and/or sulfur atoms, and wherein PEO is a high molecular weight polyalkylene oxide.

3. The blood filtration device of claim 1 wherein said spacer R is bisphenol A or bisphenol B.

4. A blood filtration device comprising:

a housing;

a permeable filter structure having a membrane filter and a coating thereon comprising an isopolymer of a high molecular weight tetraacrylatepolyalkylene oxide polymerized by exposure to radiation, the permeable filter being located in the housing and being rotatable about an axis;

an annular gap between the housing and the permeable filter structure;

a liquid inlet port connectable to a blood supply and providing fluid communication to the annular gap; and a drive member to rotate the filter structure at a speed sufficient to create a shear rate.

5. A system for separating filtrate from a fluid suspension, the system comprising:

a housing body having a hollow interior and an inner surface;

a rotor member rotatable within the interior of the housing body, the rotor member having an outer surface spaced from the inner housing surface to define a gap therebetween;

an inlet fluid path for allowing a blood product to flow into the gap:

a microporous filter membrane attached tot he outer surface of the rotor member for common rotation therewith, the filter having a coating thereon comprising an irradiated condensation product of a high molecular weight tetraacrylatepolyalkylene oxide; and a device for rotating the rotor member.

6. A blood filtration device comprising:

a housing body having a hollow interior and an inner surface;

a rotor member rotatable within the interior of the housing body, the rotor member having an outer surface spaced from the inner housing surface to define a gap therebetween;

an inlet for supplying a blood product into the gap;

a microporous filter membrane defining the outer surface of the rotor member, the filter matrix having a coating thereon comprising an insitu condensation product of a first electrophilically active, high molecular weight polyalkylene oxide and a second high molecular weight bifunctional diamino-polyoxyalkylene derivative, wherein the polyalkylene oxides can comprise up to polybutylene oxide; and a device for rotating the rotor member.

* * * * *